United States Patent
Bonaventura et al.

(10) Patent No.: US 7,324,275 B2
(45) Date of Patent: Jan. 29, 2008

(54) MICROSCOPE STAGE APPARATUS AND MOVEMENT MEANS

(75) Inventors: Russell Bonaventura, Williamsville, NY (US); Scott W. Parks, Amherst, NY (US)

(73) Assignee: Leica Microsystems CMS GmbH, Wetzlar (DE)

( * ) Notice: Subject to any disclaimer, the term of this patent is extended or adjusted under 35 U.S.C. 154(b) by 72 days.

(21) Appl. No.: 10/721,695

(22) Filed: Nov. 25, 2003

(65) Prior Publication Data

US 2005/0111094 A1 May 26, 2005

(51) Int. Cl.
*G02B 21/26* (2006.01)

(52) U.S. Cl. .................. 359/393; 359/368; 359/391

(58) Field of Classification Search ................ 359/368, 359/391

See application file for complete search history.

(56) References Cited

U.S. PATENT DOCUMENTS

| | | | |
|---|---|---|---|
| 4,749,270 A * | 6/1988 | Endo et al. ................ 359/392 |
| 5,907,157 A * | 5/1999 | Yoshioka et al. ......... 250/492.2 |
| 6,018,415 A * | 1/2000 | Woo et al. ................. 359/393 |
| 6,049,420 A * | 4/2000 | Kraft ......................... 359/393 |
| 6,118,581 A * | 9/2000 | Domanik et al. ........... 359/392 |
| 6,358,749 B1 * | 3/2002 | Orthman .................... 436/177 |
| 2003/0169492 A1* | 9/2003 | Nishida et al. ............. 359/393 |
| 2005/0066751 A1* | 3/2005 | Harris ...................... 73/864.45 |
| 2005/0111096 A1* | 5/2005 | Roeth et al. ............... 359/393 |

OTHER PUBLICATIONS

Leitz Service. "Ergolux B 0 1—Ersatzteilliste", Ernst Leitz Wetzlar GmbH, Jun. 14, 1982 Leica Service. "Leica FTM-20", p. 3 and 11, 1995. Leica Service. "Leitz Secolux 6×6," Ernst Leitz Wetzlar GmbH, 1982.

\* cited by examiner

*Primary Examiner*—Joshua L Pritchett
(74) *Attorney, Agent, or Firm*—Simpson & Simpson, PLLC

(57) ABSTRACT

The invention includes an apparatus for controlling a microscope stage assembly having a rod for moving the stage in two directions. The rod is detachably secured to the microscope stage assembly. The rod includes at least one substantially circular stick with an attachment end and a gripping end. The attachment end is arranged to be detachably secured to the microscope stage assembly. The invention also includes an interchangeable microscope stage movement device for providing X and Y movement of a sample. The device includes a microscope stage assembly and a joystick detachably secured to the stage assembly at more than one location of the stage assembly.

20 Claims, 4 Drawing Sheets

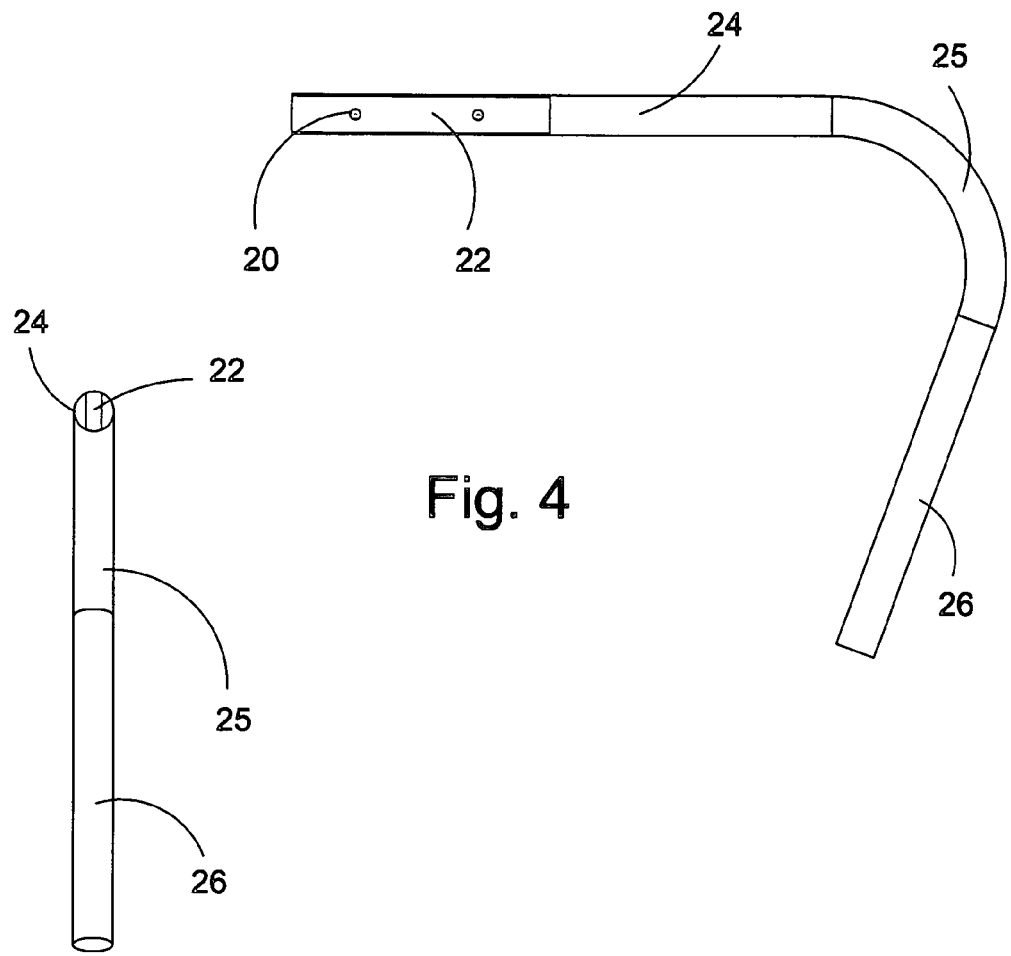
Fig. 4
Fig. 5
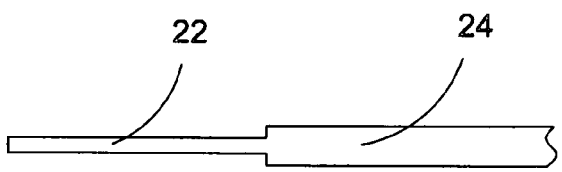
Fig. 6

MICROSCOPE STAGE APPARATUS AND MOVEMENT MEANS

FIELD OF THE INVENTION

The present invention relates generally to a microscope stage apparatus, and more particularly, to a bidirectional, ergonomic stage movement means.

BACKGROUND OF THE INVENTION

A standard microscope includes a light source, an objective lens and viewing arrangements (e.g. eyepiece or camera/CRT) for examination or manipulation of objects at high magnifications. Standard microscopes include commercially available petrographic, metallographic and semiconductor microscopes.

Microscopes are designed to include a stage where the specimen (usually mounted onto a glass slide) is placed for observation. A stage can be classified according to design and functionality. In the simplest case, the plain stage assembly consists of a rectangular or square design containing several clips to hold the specimen slide. The stage assembly also contains an opening in the center to allow light from the condenser to pass through the specimen (the stage opening).

The stage assembly is often equipped with a mechanical device that holds the specimen slide in place and can smoothly translate the slide back and forth as well as from side to side. This specimen slide translational control device is commonly referred to as a mechanical stage. This mechanical stage is used to position the specimen or sample within the optical path. Moving the stage forwards and backwards and left and right can thus manipulate the sample. A common convention for naming the left-right and front-back axes is X and Y, respectively.

A simple (commonly termed "plain") microscope stage assembly contains an opening to admit light from the condenser, occasional mounting holes for mechanical slide holders, and two clips that secure the specimen slide in place for observation under increasing magnification (changing of objectives) and for photomicrography. This plain stage is very useful for quick examination of specimens, but is very difficult to use with higher power objectives (above 20×). At high magnification, small translations of the specimen slide will quickly translate features of interest completely out of the viewing field, leading to frustration during microscopist attempts to relocate them. Auxiliary mechanical stages attached to a simple stage can allow for minute translation of the specimen slide, making it easier for the microscopist to find specific areas on the slide. Furthermore, the auxiliary mechanical stage contains controls so the microscopist can examine the entire microscope slide (secured to the stage with the slide holder).

Although many stage assemblies are known in the art, an exemplar assembly which allows such refined specimen positioning, includes a lower stage fixed indirectly to the microscope stand, an upper stage directly driven and guided with respect to the lower stage by a mechanism such as a ball guide, roller guide, or shaft guide, and a slide mount. The slide mount is inserted between the upper and lower stage by a slide mount guide and allows a specimen to move in a direction perpendicular to the upper stage. Thus, with a slide mount fixed on the slide mount guide, a sample can be maneuvered in two directions.

However, due to the variety of microscopists using these instruments, both left and right-handed stages are required. The location of the stage control mechanism is on the side of the stage matching the user's predominant hand of use. Having to match the stage configuration to the microscopist's predominate hand creates difficulty during manufacture of products. Each microscope must be either a left-handed or a right-handed microscope. After the assembly is complete, changing the configuration requires significant disassembly and reassembly time, as well as requiring a complete additional stage mechanism. This problem also requires microscope manufacturers to maintain inventories of both left-handed and right-handed stage assemblies.

While conventional microscope design has not necessarily been a problem for short-term use, long-term sessions have historically created problems for microscopists. Prolonged use of a microscope may lead to physical (sometimes permanently debilitating) problems especially with the visual and musculoskeletal systems. Thus, as microscopes continue to become more commonplace in geological, biological, and medical laboratories and in factories manufacturing electronic components and integrated circuits for computers and the consumer electronics industry, ergonomic design has become an important consideration.

Ergonomics has been defined as an applied science concerned with designing and arranging things people use so that the people and things interact most efficiently and safely (called also human engineering). Accessibility issues have also required flexibility in microscope design so that those with mobility problems may be able to effectively perform job functions.

What is needed then is a microscope stage apparatus with a bidirectional, ergonomic movement means such that the specimen may be properly oriented upon the stage prior to being inserted into the microscope optical path.

SUMMARY OF THE INVENTION

An apparatus for controlling a microscope stage assembly including a bi-directional, ergonomic stage movement means operatively arranged to be detachably secured to the microscope stage assembly.

A microscope stage movement means including at least one substantially linear, rounded shaft with an attachment end and a gripping end wherein the attachment end is operatively arranged to be detachably secured to a microscope stage assembly.

An interchangeable microscope stage movement device for providing X and Y movement of a sample including a microscope stage assembly and a joystick detachably secured to said stage assembly at more than one location of said stage assembly.

A general object of the invention is to provide a stage assembly movement means for movement of a microscope specimen that can be easily and quickly interchanged for use by right-handed and left-handed people.

Another object of the invention is to provide an ergonomic stage movement means which allows controlled, precise and rapid movement of the stage assembly in an X and Y direction.

These and other objects, features and advantages of the invention will become readily apparent to one having ordinary skill in the art upon study of the following detailed description in view of the drawings and appended claims.

BRIEF DESCRIPTION OF THE DRAWINGS

The nature and mode of operation of the present invention will now be more fully described in the following detailed description of the invention taken with the accompanying drawing figures, in which:

FIG. 4 is an exploded side perspective view of the bidirectional, ergonomic stage movement means of the present invention, depicting the distal portion, the intermediate portion and the proximal portion;

FIG. 5 is an exploded elevational view of the bidirectional, ergonomic stage movement means of the present invention;

FIG. 6 is an exploded plan view of the top of the proximal portion of the bidirectional, ergonomic stage movement means of the present invention; and, FIG. 7 is a perspective view of the back of the stage assembly showing the attachment means for the proximal portion of the bidirectional, ergonomic stage movement means of the present invention.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments.

Furthermore, it is to be understood that this invention is not limited to the particular methodology, materials and modifications described and as such may, of course, vary. It is also to be understood that the terminology used herein is for the purpose of describing particular embodiments only, and is not intended to limit the scope of the present invention, which will be limited only by the appended claims.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

All publications mentioned are incorporated herein by reference for the purpose of describing and disclosing, for example, materials and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

The present invention broadly comprises a microscope apparatus including a microscope stage assembly and an interchangeable, bidirectional, ergonomic stage assembly movement means. The stage assembly includes an upper and lower stage, a slide mount, and a slide mount guide. In the embodiment shown in FIG. 1, the stage assembly is adapted to receive the interchangeable, bidirectional, ergonomic stage assembly movement means. The stage movement means can be operatively arranged in several locations on the stage assembly to allow bidirectional movement of a specimen on the stage.

Figure 1:
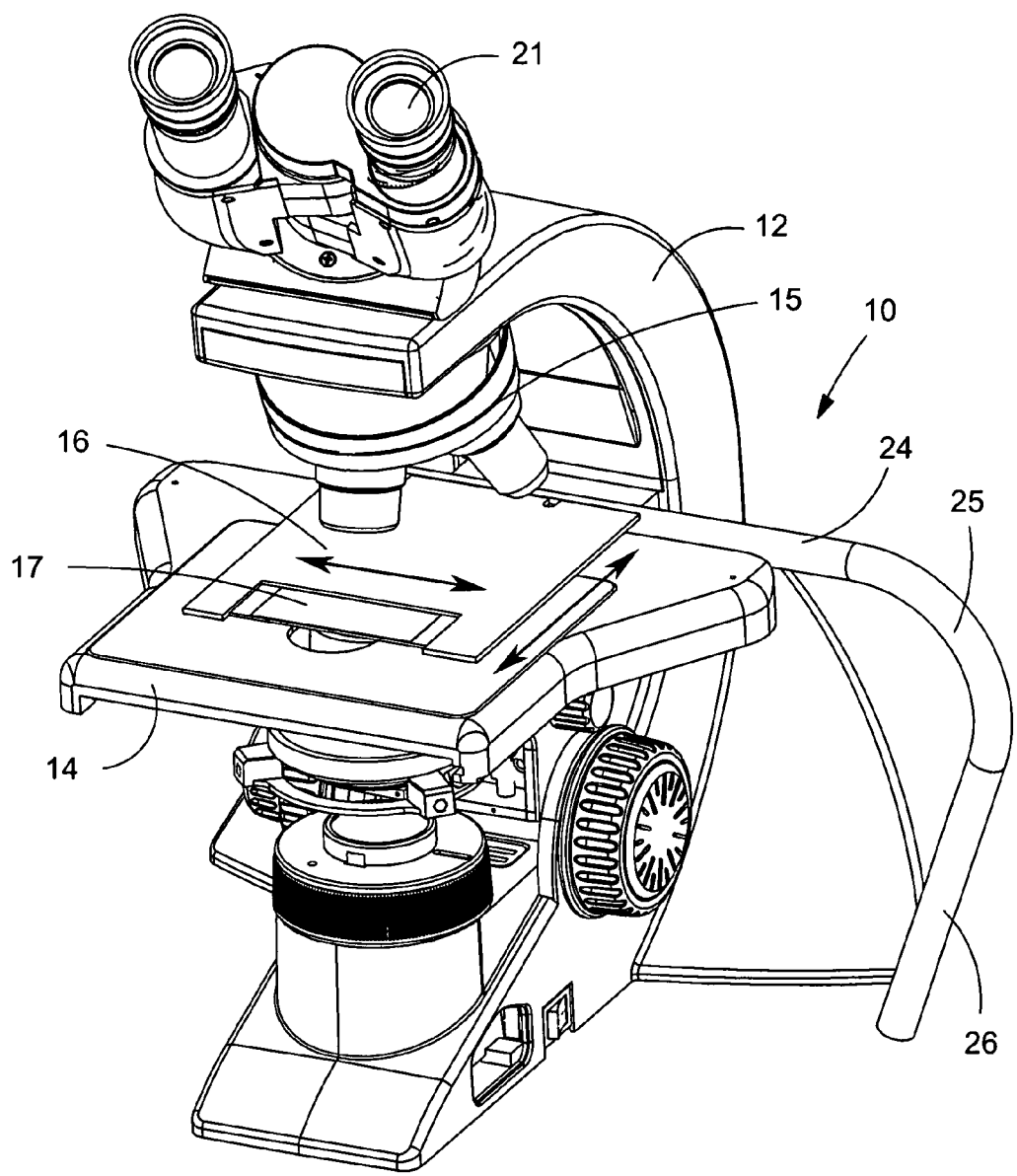
FIG. 1 is a perspective view of a typical compound microscope configured for use with the bidirectional, ergonomic stage movement means of the present invention.

A conventional compound microscope is shown in perspective view in FIG. 1. Although the embodiments and drawings advert to a light microscope with the microscope stage assembly and an interchangeable, bidirectional, ergonomic stage movement means operatively arranged to be detachably secured to said microscope stage assembly, the invention is suitable for use with a variety of microscopes known to those of skill in the art. This includes but is not limited to inverted microscopes, metallurgical microscopes, polarizing microscopes, measuring microscopes, and stereomicroscopes.

FIG. 1 illustrates a compound microscope. The microscope includes mounting stand 12 to which all the component pieces of the microscope are mounted. In the description below, the terms "forward", "backward", "left", "right", and their derivatives, should be interpreted from the perspective of one viewing the microscope shown in FIG. 1. In the embodiment shown, the viewing body is binocular, comprising stand 12 and two eyepieces 21. The viewing body is not germane to the invention, which is suitable for use with a microscope configured with any type of viewing body (monocular, binocular, trinocular, video, etc.). Objectives lenses are mounted to rotatable turret 15. Slide mount 16 is incorporated into the stage assembly and enables movement of slide 17 holding the specimen to be viewed. A coarse focus knob and fine focus knob are rotatably mounted to stand 12 and allow for the viewing of different depths within the specimen.

It is also contemplated that slide mount 16 may be another microscope stage contrasting means, for example, as described in the application titled "Microscope Stage Contrasting Means" filed concurrently herewith, and incorporated herein in its entirety. Optionally, an interchangeable microscope stage drive assembly (not shown) may be adaptably incorporated into the stage assembly. The disclosure of an interchangeable microscope stage drive assembly, filed concurrently herewith and titled "Interchangeable Microscope Stage Drive Assembly" is incorporated herein in its entirety.

Figure 2:
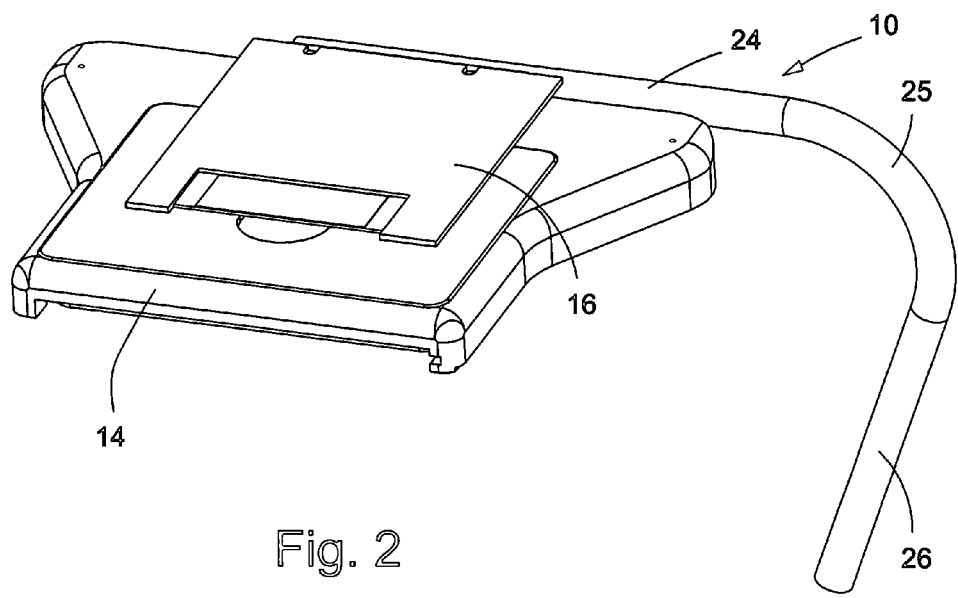
FIG. 2 is a top perspective view of a stage assembly with the bidirectional, ergonomic stage movement means of the present invention, having the bidirectional, ergonomic stage movement means operatively arranged for right-handed use.

FIG. 2 is a top perspective view of a stage assembly with stage movement means 10 of the present invention, having stage movement means 10 operatively arranged for right-handed use. Upper stage 14 supports slide mount 16. In this embodiment, stage movement means 10 of the present invention is mounted to slide mount 16 via a slide mount guide. Slide mount 16 is generally left/right adjustable while upper stage 14 is forward/backward adjustable via stage movement means 10 of the present invention. Rigid attachment of slide mount 16 to upper stage 14 in the forward/backward (Y) axis causes slide mount 16 to move concurrently with upper stage 14. In the embodiment shown, stage movement means 10 has three components: distal portion 26, intermediate curving connector portion 25 and proximal attachment portion 24.

The stage assembly of the present invention may also be configured to comprise other sizes and shapes. The same holds for various sizes and shapes of attachments and/or accessories. For example, while slide mount 16 is shown as rectangular, it may be any shape such as circular, square or triangular.

Figure 3:
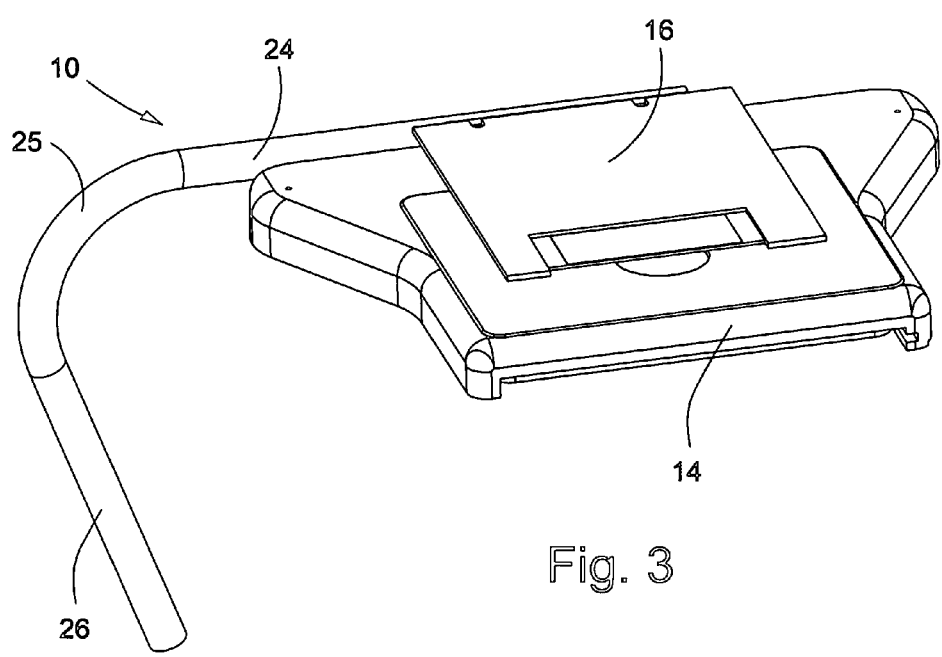
FIG. 3 is a top perspective view of a stage assembly with the bidirectional, ergonomic stage movement means of the present invention, having the bidirectional, ergonomic stage movement means operatively arranged for left-handed use.

FIG. 3 is a top perspective view of a stage assembly with stage movement means 10 of the present invention, having stage movement means 10 operatively arranged for left-handed use. While all the embodiments shown discloses distal portion 26 of stage movement means 10 being downwardly disposed and perpendicular to the longitudinal axis of the stage other variations and permutations known to those of skill in the art are contemplated. For example, the distal portion may be upwardly disposed or parallel to the stage.

Advantageously, stage movement means 10 comprises a substantially solid, circular rod with releasable attachment means. However, stage movement means 10 may instead be a substantially hollow tube of varying interior and exterior diameters. The rod or tube may be translucent or opaque. The stage movement means may be made of any material know to those of skill in the art and especially suitable for use with a microscope. This includes, but is not limited to: metals, coated metals, plastics, ceramics, etc., or the like. Optionally, stage movement means 10 may be coated with, for example, fluorescent paint or have affixed to it various labels for ease of use, better visibility under darkroom conditions, or as a teaching tool, etc.

FIG. 4 is an exploded side perspective view of stage movement means10 of the present invention, depicting distal portion 26, intermediate portion 25 and proximal portion 24. Attachment end 22 represents a modification within proximal portion 24 to allow fastening of stage movement means 10 to the stage assembly via proximal portion hole 20. As can be seen, attachment end 22 is narrowed and has at lease one flat surface to allow rigid attachment to a slide mount guide or stage assembly.

Alternatively, stage movement means 10 may be a two piece construction with a variable angle between the two pieces. Each of the distal, intermediate and proximal portions may be any size, shape or configuration. Each of these portions may in turn be made up of additional component pieces so that stage movement means 10 may have more than three portions. The plurality of pieces and/or portions may be joined together by soldering, threading, interlocking, sliding etc. or any means known to one of skill in the art. In any embodiment which comprises a stage movement means with a plurality of portions or pieces, the end not attached to the stage assembly may be narrowed or tapered to allow gripping like a pencil.

Finally, stage movement means 10 of the present invention may be a one piece, molded construction. The single piece construct may be any size, shape or configuration with one or a plurality of curves providing ergonomic benefits. As with other variants of the present invention, the end not attached to the stage assembly may be narrowed or tapered to allow gripping like a pencil.

Optionally, one portion or the entire stage movement means 10 may have grooves, protrusions, indentations to assist with the grasping of stage movement means 10 and increased control of the stage assembly. These may be any shape, size etc. Also, one may incorporate a plurality of accessories which fit over or are attached to distal portion 26 such as a gripping means for increased control (resembling, for example, the grip on a tennis handle or bicycle handlebar).

FIG. 5 is an exploded elevational view of stage movement means 10 of the present invention. It should be reiterated that while the embodiments shown depict stage movement means 10 as a circular rod or tube, any size, shape or configuration of rod or tube may be adapted for releasable attachment. Also, while intermediate portion 25 has a rounded bend region, it should be obvious that multiple bends, or sharper angles may be utilized to optimize ergonomic benefits. Distal portion 26 is shown as essentially straight, but it too may have a rounded bend, a sharp angle or a plurality of bends/angles as ergonomical design elements. Distal portion 26 may also be narrowed or tapered to allow gripping like a pencil.

FIG. 6 is an exploded plan view of the top of the proximal portion of stage movement means 10 of the present invention. As indicated, attachment end 22 represents a modification within proximal portion 24 to allow fastening of stage movement means 10 to the stage assembly. Variations, permutations and combinations as to the shape and size of attachment end 22 are intended to be within the spirit and scope of the invention as claimed. For example, attachment end 22 may be semicircular or triangular with at least one substantially flat surface which permits attachment with any component of the stage assembly.

Figure 7:
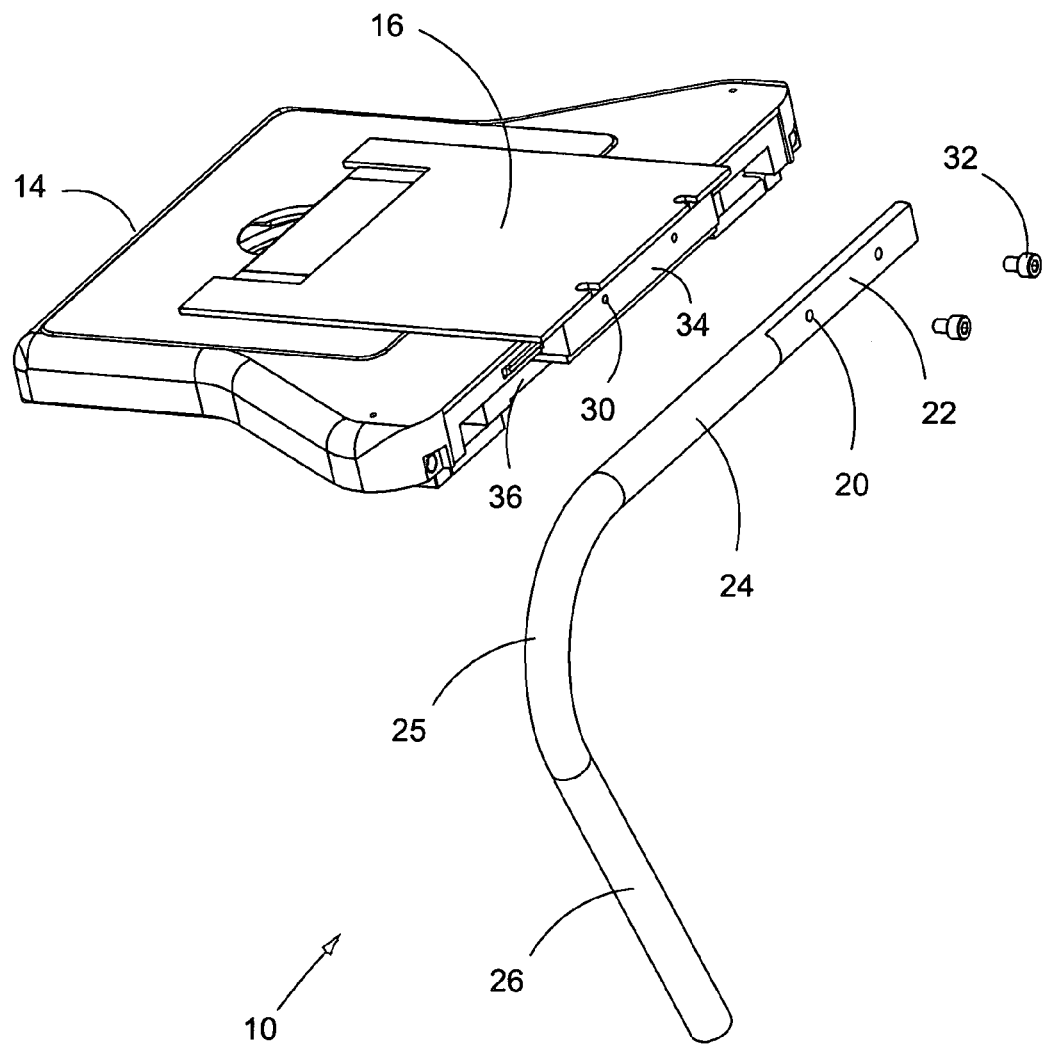

FIG. 7 is a perspective view of the back of the stage assembly showing attachment means for the proximal portion of the bidirectional, ergonomic stage movement means of the present invention. Slide mount guide 34 is operatively arranged between upper stage 14 and slide mount 16. This permits axially directed relative movement between slide mount guide 34 and upper stage 14 for left-right movement along the X-axis. Front-back movement along the Y-axis is facilitated by the placement of slide mount guide 34 below upper stage 14 and slide mount 16 and above lower stationary stage 36. Movement of slide mount 16 is made possible by the rigid attachment between slide mount 16 and slide mount guide 34.

Upper stage 14 of the present invention broadly comprises slide mount guide 34 to which stage movement means 10 is attached. While the preferred embodiment shows stage movement means 10 attached to slide mount guide 34, it is contemplated that stage movement means 10 may be alternatively attached directly to upper stage 14, the lower stage, slide mount 16 or any protrusion or accessory that controls slide or stage movement in an X and Y direction.

Further depicted in this figure are slide mount guide hole 30 on slide mount guide 34 and proximal portion hole 20 on stage movement means 10, both being rigidly affixed by at least one attachment means such as screw 32. The various components of the present invention may be releasably attached to their respective recesses via magnets, screws, nails, hook and loop type fasteners, detents, springed ball bearings, adhesive or the like.

While the FIG. 7 embodiment shows attachment of proximal portion 24 to a side surface of slide mount 34, attachment may be to any exterior surface of slide mount guide 34, such as the underside of slide mount guide 34 which allows movement in both the X and Y direction. Additionally, proximal portion 24 may be attached to the top, bottom, right or left side of the entire stage assembly or any protrusion or accessory that is affixed or a component of the stage assembly, as long as there is no interference with the X and Y movement of the specimen.

Thus, it is seen that the objects of the present invention are efficiently obtained, although modifications and changes to the invention should be readily apparent to those having ordinary skill in the art, which modifications are intended to be within the spirit and scope of the invention as claimed.

What is claimed is:

1. An apparatus for controlling a microscope stage assembly comprising:

an upper stage having left and right sides; a slide mount; a rod having a manually operable distal portion; and, a releasable attachment means, wherein said releasable attachment means is arranged to attach said rod to said slide mount and to interchange said distal portion between the left and right sides of said upper stage, said upper stage supporting said slide mount, said upper stage being arranged to move in a first direction in response to a translational movement of said rod due to manual operation of the distal portion in said first direction, and said slide mount is arranged to move in a second direction, orthogonal to said first direction, in response to a translational movement of said rod due to manual operation of the distal portion in said second direction.

2. The apparatus recited in claim 1, wherein said rod comprises a substantially hollow, circular tube with releasable attachment means.

3. The apparatus recited in claim 1, wherein said releasable attachment means is selected from a group consisting of a screws, rivets, magnets, adhesive, hook-and-eyes, and springed detents.

4. The apparatus recited in claim 1, wherein said rod further comprises an intermediate portion and a proximal portion.

5. The apparatus recited in claim 4, wherein said proximal portion is attached to said slide mount, said intermediate portion connects said distal and said proximal portion, and said distal portion is disposed in space substantially perpendicular to a longitudinal axis of said stage assembly.

6. The apparatus recited in claim 5, wherein said distal portion comprises a substantially solid, circular pole with a plurality of grooves disposed in space substantially parallel to one another.

7. The apparatus recited in claim 5, wherein said distal portion comprises a substantially solid, circular pole which tapers at the end.

8. The apparatus recited in claim 4, further comprising a gripping means, wherein said gripping means comprises a substantially square, rotatable plate operatively arranged to be detachably secured to said distal portion of said rod.

9. The apparatus recited in claim 1, wherein said rod further comprises a gripping means operatively arranged to be detachably secured to said rod.

10. The apparatus recited in claim 9, wherein said gripping means comprises a substantially hollow tube with a plurality of grooves disposed in space substantially parallel to one another.

11. The apparatus recited in claim 1 further comprising:
a joystick, wherein said releasable attachment means is arranged to attach said joystick to said slide mount.

12. The apparatus recited in claim 1, wherein said rod comprises a plurality of grooves disposed in space substantially parallel to one another.

13. The apparatus recited in claim 1, wherein said rod comprises a plurality of protuberances disposed in space substantially parallel to one another.

14. The apparatus recited in claim 1, wherein said rod comprises a one-piece, pre-formed substantially solid rod with a releasable attachment means.

15. The apparatus recited in claim 1 further comprising:
a slide mount guide directly connected to said slide mount, where said releasable attachment means is arranged to directly attach said rod to said slide mount guide.

16. The apparatus recited in claim 15, wherein said slide mount guide is positioned between said upper stage and said slide mount.

17. A microscope stage movement means comprising:
an upper stage having left and right sides;
a slide mount;
a slide mount guide;
at least one substantially linear, rounded shaft with an attachment end and a gripping end; and,
a releasable attachment means, wherein said releasable attachment means is arranged to releasably attach said shaft to said slide mount guide and to interchange said gripping end between said left and right sides of said upper stage, said slide mount guide attached to said slide mount, said upper stage supporting said slide mount, said upper stage being arranged to move in a first direction in response to a translational movement of said shaft due to manual operation of the gripping end in said first direction, and said slide mount is arranged to move in a second direction, orthogonal to said first direction, in response to a translational movement of said shaft due to manual operation of the gripping end in said second direction.

18. The apparatus recited in claim 17, wherein said slide mount guide is positioned between said upper stage and said slide mount.

19. An interchangeable microscope stage movement device for providing X and Y movement of a sample comprising:
an upper stage having left and right sides;
a slide mount, wherein said upper stage supports said slide mount;
a slide mount guide connected to said slide mount; and,
a joystick having a manually operable distal portion and a proximal attachment portion, said proximal attachment portion detachably secured directly to slide mount guide at more than one location of said slide mount guide permitting, interchange of said distal portion between the left and right sides of said upper stage.

20. The apparatus recited in claim 19, wherein said slide mount guide is positioned between said upper stage and said slide mount.

* * * * *